United States Patent

Baum

(10) Patent No.: US 9,651,791 B2
(45) Date of Patent: May 16, 2017

(54) VIEWING DEVICE, STEREO PROJECTION SYSTEM, AND USE OF CYANINE DYES IN A SUPRAMOLECULAR J-AGGREGATE CONFIGURATION

(71) Applicant: INFITEC GMBH, Ulm (DE)

(72) Inventor: Maximilian Baum, Woerthsee (DE)

(73) Assignee: INFITEC GMBH, Ulm (DE)

( * ) Notice: Subject to any disclaimer, the term of this patent is extended or adjusted under 35 U.S.C. 154(b) by 381 days.

(21) Appl. No.: 14/304,051

(22) Filed: Jun. 13, 2014

(65) Prior Publication Data

US 2014/0293229 A1 Oct. 2, 2014

Related U.S. Application Data

(63) Continuation of application No. PCT/EP2012/005109, filed on Dec. 11, 2012.

(30) Foreign Application Priority Data

Dec. 13, 2011 (DE) .......................... 10 2011 120 834

(51) Int. Cl.
  *G02B 27/22* (2006.01)
  *G02B 5/22* (2006.01)
  *H04N 13/04* (2006.01)

(52) U.S. Cl.
  CPC ............. *G02B 27/22* (2013.01); *G02B 5/223* (2013.01); *G02B 27/2207* (2013.01); *H04N 13/0431* (2013.01); *H04N 13/0459* (2013.01)

(58) Field of Classification Search
  CPC .... G02B 27/22; G02B 27/2207; G02B 5/223; H04N 13/0431
  USPC .......................................................... 359/464
  See application file for complete search history.

(56) References Cited

U.S. PATENT DOCUMENTS

| | | | | |
|---|---|---|---|---|
| 4,705,371 A | * | 11/1987 | Beard | H04N 13/0431 348/E13.037 |
| 4,836,647 A | * | 6/1989 | Beard | H04N 13/0431 348/60 |
| 4,893,898 A | * | 1/1990 | Beard | H04N 13/0431 348/60 |
| 5,218,386 A | * | 6/1993 | Levien | G02C 7/104 348/E13.037 |

(Continued)

FOREIGN PATENT DOCUMENTS

| | | |
|---|---|---|
| DE | 198 08 964 A1 | 9/1999 |
| JP | 2002-122730 | 4/2002 |

*Primary Examiner* — Bao-Luan Le
(74) *Attorney, Agent, or Firm* — Muncy, Geissler, Olds & Lowe, P.C.

(57) ABSTRACT

A viewing device for a stereo projection system, having a first and a second viewing window, each having an optically filtering filter layer system, wherein each viewing window has a filter spectrum in the visual spectral range having a plurality of pass bands that are separated from each other by blocking regions, and wherein each pass band of the filter spectrum of the first viewing window is covered by an associated blocking region of the filter spectrum of the second viewing window. Each filter layer system can be designed as an absorption filter layer system having a plurality of substances absorbing in differing spectral ranges, wherein at least one of the absorbing substances is a cyanine dye in the supramolecular configuration of a J-aggregate.

8 Claims, 2 Drawing Sheets

(56) References Cited

U.S. PATENT DOCUMENTS

| | | | | |
|---|---|---|---|---|
| 5,559,632 A * | 9/1996 | Lawrence | | G02B 27/2207 348/E13.008 |
| 5,835,166 A * | 11/1998 | Hall | | G02B 5/3016 348/E13.004 |
| 7,241,564 B2 * | 7/2007 | Ihama | | G03C 1/047 430/567 |
| 7,604,348 B2 * | 10/2009 | Jacobs | | G02B 27/017 351/159.6 |
| 7,784,938 B2 * | 8/2010 | Richards | | G02B 27/2207 351/159.65 |
| 7,832,869 B2 * | 11/2010 | Maximus | | G02B 26/007 348/60 |
| 7,850,304 B2 * | 12/2010 | Jacobs | | G02B 26/026 351/159.6 |
| 7,976,159 B2 * | 7/2011 | Jacobs | | G02B 27/017 351/159.76 |
| 8,194,119 B2 * | 6/2012 | Ramstad | | H04N 13/0431 348/51 |
| 8,303,112 B2 * | 11/2012 | Jacobs | | G02B 27/017 351/158 |
| 8,459,796 B2 * | 6/2013 | Richards | | G02B 27/2207 351/159.65 |
| 8,503,078 B2 * | 8/2013 | Richards | | G02B 27/2207 359/464 |
| 8,537,463 B2 * | 9/2013 | Richards | | G02B 27/2207 359/464 |
| 2006/0024626 A1 * | 2/2006 | Ihama | | G03C 1/047 430/567 |
| 2007/0127121 A1 * | 6/2007 | Maximus | | G02B 26/007 359/465 |
| 2007/0236764 A1 * | 10/2007 | Ihama | | G03C 1/047 359/3 |
| 2008/0278574 A1 * | 11/2008 | Ramstad | | H04N 13/0431 348/51 |
| 2008/0278807 A1 * | 11/2008 | Richards | | G02B 27/2207 359/464 |
| 2009/0073558 A1 * | 3/2009 | Jacobs | | G02B 27/017 359/464 |
| 2009/0322857 A1 * | 12/2009 | Jacobs | | G02B 27/017 348/42 |
| 2009/0322861 A1 * | 12/2009 | Jacobs | | G02B 26/026 348/53 |
| 2010/0066976 A1 * | 3/2010 | Richards | | G02B 27/2207 352/60 |
| 2010/0067108 A1 * | 3/2010 | Richards | | G02B 27/2207 359/464 |
| 2010/0073769 A1 * | 3/2010 | Richards | | G02B 27/2207 359/464 |
| 2010/0103355 A1 | 4/2010 | Sakamoto et al. | | |
| 2010/0208041 A1 * | 8/2010 | Savvateev | | G02B 27/2207 348/51 |
| 2010/0214397 A1 * | 8/2010 | Gaskevich | | G02B 27/2207 348/60 |
| 2011/0043753 A1 * | 2/2011 | Jacobs | | G02B 26/026 351/159.75 |
| 2011/0063726 A1 * | 3/2011 | Ramstad | | G02B 27/2207 359/464 |
| 2011/0228215 A1 * | 9/2011 | Jacobs | | G02B 27/017 351/159.6 |
| 2012/0107530 A1 * | 5/2012 | Morishima | | B41M 5/405 428/32.31 |
| 2012/0307358 A1 * | 12/2012 | Baum | | G02B 27/2207 359/464 |

* cited by examiner

VIEWING DEVICE, STEREO PROJECTION SYSTEM, AND USE OF CYANINE DYES IN A SUPRAMOLECULAR J-AGGREGATE CONFIGURATION

This nonprovisional application is a continuation of International Application No. PCT/EP2012/005109, which was filed on Dec. 11, 2012, and which claims priority to German Patent Application No 10 2011 120 834.1, which was filed in Germany on Dec. 13, 2011, and which are both herein incorporated by reference.

BACKGROUND OF THE INVENTION

Field of the Invention

The invention relates to a viewing device for a stereo projection system, having a first and a second viewing window, each having an optically filtering filter layer system, wherein each viewing window has a filter spectrum in the visual spectral range with a plurality of pass bands that are separated from each other by blocking regions, and wherein each pass band of the filter spectrum of the first viewing window is covered by an associated blocking region of the filter spectrum of the second viewing window.

The invention also relates to a stereo projection system having a projection unit that projects a first and a second image, which represent an object from different viewing angles, onto one another on a projection screen in the visual spectral range with orthogonal projection spectra, and a viewing device that has a first and a second viewing window, each having an optically filtering filter layer system, whose orthogonal filter spectra in the visual spectral range are matched to the projection spectra of the projection unit in such a manner that the first viewing window is transparent for the first projection spectrum and the second viewing window is transparent for the second projection spectrum, wherein each viewing window has a filter spectrum in the visual spectral range with a plurality of pass bands that are separated from each other by blocking regions, and wherein each pass band of the filter spectrum of the first viewing window is covered by an associated blocking region of the filter spectrum of the second viewing window.

Also, the invention relates to a novel use of cyanine dyes in the supramolecular J-aggregate configuration.

Description of the Background Art

The prototype of the so-called wavelength multiplex stereo projection is known from DE 198 08 964 C2.

Various approaches are known for the three-dimensional optical reconstruction of objects. Stereoscopic projection, in particular, has found wide acceptance. In this approach, two sub-images are produced of an object that depict the object from different viewing angles. The difference in angle of view corresponds to the visual parallax of a human observer. To produce a three-dimensional impression of the object, a projection unit and a viewing device in a stereo projection system must interact in such a way that a viewer who is viewing the projected images through the viewing windows of the viewing device sees the sub-image associated with the right eye only with his right eye, and the sub-image associated with the left eye only with his left eye. Different approaches are known to achieve this interaction. In particular, approaches are pursued for temporal, spectral, and/or polarization-related separation of the sub-images. Within the framework of spectral separation of the sub-images, wavelength multiplexing has proven to be especially advantageous, since very good color representation of the object is possible with this method.

In wavelength multiplexing, the two sub-images with mutually orthogonal projection spectra are projected onto a projection screen, for example a movie screen. Within the scope of the present description, orthogonal projection spectra are in general understood to be projection spectra whose spectral bands do not overlap one another in the visible range. In wavelength multiplexing, each projection spectrum comprises multiple spectral bands spaced apart from one another. These bands are preferably oriented toward the location of the spectral sensitivities of the three color receptor types of the human eye. In this context, the bands of the projection spectrum for the right sub-image are offset relative to the bands of the projection spectrum for the left sub-image so that the above described condition of orthogonality of the projection spectra is fulfilled. The sub-images thus produced are projected congruently onto one another on the projection screen. In addition, temporal offsets and/or polarization differences can be provided; however, this leads to a loss of brightness, and is thus undesirable as a general rule. In the cited document, the different projection spectra are achieved through the use of three lasers each, whose wavelengths lie in the red, green, or blue spectral region and are slightly offset from one another in pairs. It is also possible, and known, to generate the projection spectra from a white light source by means of sharp interference edge filters, however.

In order to ensure that the individual sub-images are received separately by the viewer's right and left eyes, a viewing device is provided that has one viewing window for the right eye and another viewing window for the left eye. The viewing windows have different filter spectra, which are orthogonal to one another and are matched to the projection spectra. In particular, the filter spectrum of the viewing window associated with the left eye has pass bands precisely where the bands of the projection spectrum of the left sub-image are located. Conversely, it has blocking regions precisely where the bands of the projection spectrum of the right sub-image are located. The filter spectrum of the viewing window associated with the right eye is designed in the same fashion. The filter spectra of the two viewing windows are orthogonal to one another, where "orthogonal filter spectra" should be understood within the scope of the present description as filter spectra whose pass bands do not overlap with one another. In practice, it will seldom be possible to design the filter characteristics of the viewing windows such that zero transmission is actually present in the blocking region. The concept "not overlapping" must thus be construed functionally with regard to the desired goal of separate perception of the sub-images.

Because of the high contrast sensitivity of the human eye, the selectivity of the filter spectra of the viewing device is of great importance to the quality of a stereo projection system. In order to create suitable viewing windows, the said document proposes coating stiff, transparent carriers with an interference filter layer system. Filters of this nature can be designed precisely and exhibit very sharp pass bands and blocking regions. However, their manufacture is very complex and expensive. Moreover, a stiff carrier is a mandatory requirement, which is disadvantageous with regard to weight and shape adjustment. These disadvantages weigh especially heavily in the customary, eyeglass-like design of viewing devices for stereoscopic cinema projection systems, in which the stereoscopic eyeglasses must be made large enough that they can also be worn over ordinary corrective eyeglasses. In addition, the filter spectrum of interference filters is heavily dependent on the angle of incidence of the light, and hence on the position of the viewer or the reflection location on the screen, both of which are disadvantageous in large movie theaters with a wide screen.

Another disadvantage for the purposes of stereoscopic cinema projection is the durability of the prior art interference filter glasses. In order to amortize the high purchasing costs of stereo projection systems, movie theater operators are forced to charge higher prices for stereoscopic shows than for conventional shows. Psychologically, this is especially easy to implement for the purchase or rental of the stereoscopic glasses. Because of the high costs of conventional interference glasses, this is only practical within the framework of rental. But this entails additional difficulties with regard to theft prevention and hygiene. Disposable, non-reusable eyeglasses that are inexpensive to produce, which would allow the movie theater operator to sell a new pair of glasses to every patron for every show without the need to worry about collecting and cleaning used eyeglasses after every show, would be especially desirable.

A completely different area of optical filter technology is represented by US 2010/0103355 A1, which discloses an LCD display that proposes an additional color correction plate having a filter layer with a J-aggregate of a cyanine dye embedded between two protective layers in order to improve spectral selectivity between the R and G channels and between the G and B channels.

SUMMARY OF THE INVENTION

It is therefore an object of the present invention to make available economical viewing devices for stereo projection systems that are only usable for a strictly limited time period.

Another object of the invention is the provision of stereo projection systems that use such viewing devices.

As described below, the attainment of these objects additionally represents a new field of application for cyanine dyes in a supramolecular J-aggregate configuration.

These objects are attained in connection exemplary embodiments in that each filter layer system is designed as an absorption filter layer system having a plurality of substances absorbing in differing spectral ranges, wherein at least one of the absorbing substances is a cyanine dye in the supramolecular configuration of a J-aggregate.

The said novel use of cyanine dyes in the supramolecular configuration of a J-aggregate is the use as absorbing substances in optically filtering filter layer systems of viewing windows of viewing devices according to the invention, in particular in stereo projection systems according to the invention.

Firstly, the invention provides for a rejection of the dogma that adequately sharp filter layer systems can only be produced using interference filters. In contrast thereto, it is proposed to use filter layer systems from absorption filters. The person skilled in the art is familiar with a plurality of absorption dyes that can act as absorbing substances in such an absorption filter system. Appropriate selection of the dyes should be made in consideration of the particular application. In particular, the filter characteristics, as discussed above, must be matched very well to the applicable projection unit. The person skilled in the art who is versed in the field of dye chemistry will have no difficulty undertaking such a matching in practice.

It is also provided in accordance with the invention to use a cyanine dye as at least one of the absorbing substances. Cyanine dyes are also generally known to the person skilled in the art. However, it is proposed in accordance with the invention to use these dyes in the supramolecular configuration of a J-aggregate. J-aggregates, which sometimes are also referred to as Scheibe aggregates, are generally known to the person skilled in the art, as is their manufacture. An important characteristic of J-aggregates is the spectral steepening of their absorption spectra in comparison to conventional molecular dye. The use of cyanine dyes in a J-aggregate configuration is thus especially well suited to create sharp pass bands and blocking regions in the filter spectrum of the viewing window. Surprisingly, however, it has become apparent that highly concentrated J-aggregates of cyanine dyes, such as are required to create sufficient extinction for use as stereo projection filters, are manifestly light-sensitive. Thus, the J-aggregate configuration is gradually destroyed by the absorption of light, with the result that the originally sharp filter spectrum gradually deteriorates so that the original orthogonality between the filter spectra of the two viewing windows of the viewing device is destroyed. Consequently, the two projected single images can no longer be furnished with sharp separation to the right or left eye, so that the stereo effect diminishes. Consequently, stereo eyeglasses constructed in this way are not reusable.

The advantages of the invention have an especially strong influence when each blocking region of the filter spectrum of each viewing window has a cyanine dye in the supramolecular J-aggregate configuration as the absorbing substance. However, since the stereo effect diminishes significantly when significant crosstalk occurs between the viewer's two eyes in one of the pass bands, it is generally sufficient if only one of the absorbing substances present in the filter system is a cyanine dye in the supramolecular J-aggregate configuration. This allows space for the use of a broad range of other dyes as additional absorbing substances. It turns out that rhodamines and squaraines can be used especially well here.

Preferably, each filter layer system can have a plurality of individual filter layers, wherein each individual filter layer contains one or more absorbing substances that jointly produce exactly one of the blocking regions of the filter spectrum. In this way, each blocking region can be designed individually and independently of the other blocking regions of the filter spectrum. Moreover, the layered construction makes it possible to place completely homogeneous layers with well-defined filter characteristics atop one another. It has namely become apparent that homogeneity over the entire area of the viewing window contributes substantially to the quality of the stereo impression.

In a manufacturing method, each filter layer system is knife-coated onto a carrier that is transparent in the visible spectral range. In particular, a highly concentrated solution of a dye or dye mixture is first produced and knife-coated onto the carrier. The choice of solvent and of any additives, such as surfactants and/or salts for example, is tailored to the dye in question and, if applicable, to the desired production of J-aggregates. Then the solvent is allowed to dry, if applicable with the application of heat. This process is repeated in layers with additional dye solutions.

Alternatively, a cascade coating method can also be employed. A flexible film that is transparent in the visible spectral range is used by preference as a flexible carrier. The advantages of the film form with regard to weight, transport properties, and shaping within the viewing device are self-evident. Unlike with interference filters, a flexible design of the filter system is thus also possible in the absorption filters according to the invention.

In order to produce a high-quality stereo impression, high selectivity between the viewer's eyes is necessary, as mentioned above. However, the contrast sensitivity of the human eye is limited as well, so that a certain, minor overlap of the spectra is still tolerable, and still falls within the limits of "orthogonal" for the purposes of the present description. In particular, it has proven to be beneficial for the transmittance of each viewing window in each blocking region of its filter spectrum to be less than 1% of the transmittance of the associated pass band of the filter spectrum of the respective other viewing window.

Nonetheless, the selectivity between the pass band and blocking region within a filter system should also be quite sharp. Therefore, provision is advantageously made for the transmittance of each viewing window in each blocking region of its filter spectrum to be less than 1% of the transmittance of each immediately adjacent pass band of the filter spectrum of the same viewing window.

Additional features and advantages of the invention are evident from the following specific description and the drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
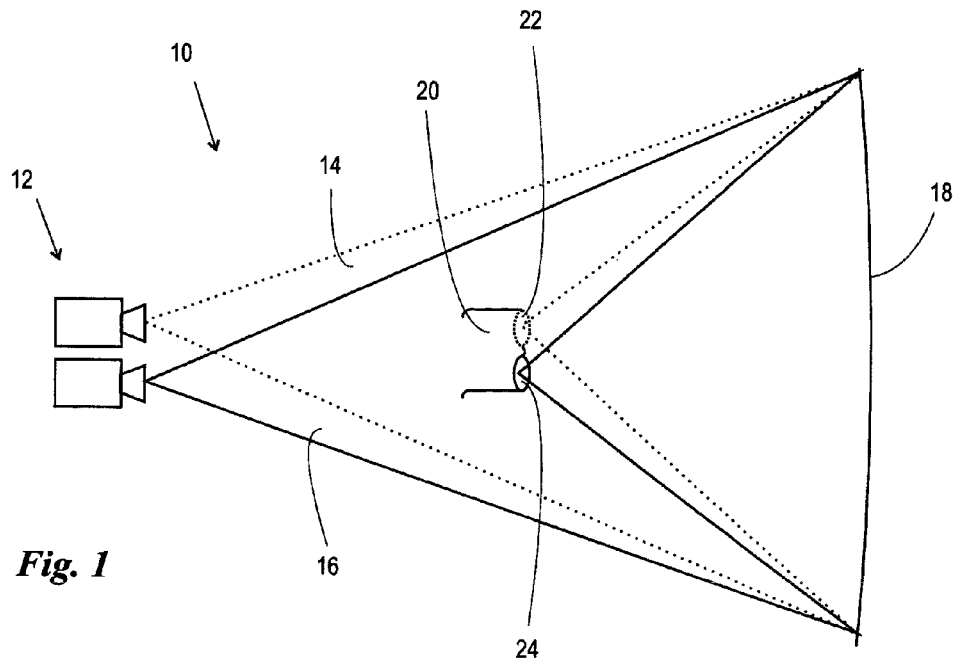
FIG. 1 is a schematic representation of a stereo projection system.

FIG. 1 shows a schematic representation of a stereo projection system 10. The system has a stereo projection unit 12, which is shown as two separate projectors in FIG. 1. Usually, special stereo projectors are used; a multiplicity of variants is known for these. Common to all of these variants is the result that two images 14, 16, which depict an object from different viewing angles, are projected congruently onto one another on a projection screen 18. The view angles 14, 16 typically correspond to the angles with which the image of an object is formed by the left or right eye of a viewer. Such images can be generated by shooting an object from different camera angles. Alternatively, they can also be computed by a digital data processing system and produced by means of a suitable projection unit 12. Accordingly, the projection unit 12 can involve analog transmitted-light projectors equally well as digital projectors that construct the images 14, 16 through superposition of different colored lasers, for example. The precise method of generation of the images 14, 16 is largely immaterial to the result, namely the congruently superimposed depiction on the projection screen 18 of an object from two different viewing angles.

The superimposed image projected onto the screen 18 is viewed by a viewer through a viewing device 20. In the embodiment shown, the viewing device 20 is implemented as eyeglasses, the lenses of which represent the viewing windows 22, 24 of the viewing device 20. The characteristics of the viewing windows 22, 24 must be matched to the projection characteristics of the images 14, 16 such that the image 14, which represents the object from a viewing angle that corresponds to viewing from a viewer's left eye, is only allowed to pass through the left viewing window 22 of the viewing device 20. In contrast, it must be blocked by the right viewing window 24. Similar conditions apply to the right image 16, which must only be allowed to pass through the right viewing window, and must be blocked out by the left viewing window 22. Within the scope of the present invention, this separation takes place through spectral separation. In particular, the images 14, 16 are projected with different, non-overlapping projection spectra 26, 28 onto the screen 18. The viewing windows 22, 24 are implemented as spectral filters whose filter spectra 30, 32 are matched to the projection spectra of the images 14, 16 in accordance with the requirements outlined above.

Figure 2:
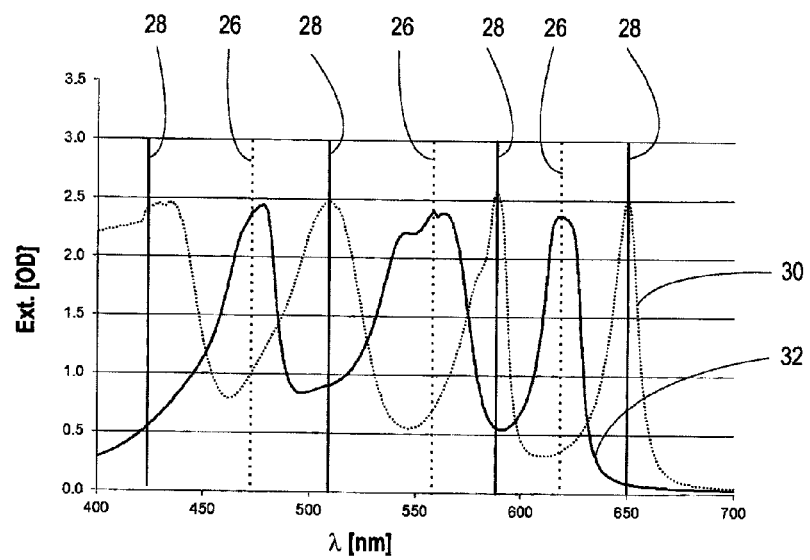
FIG. 2 is an exemplary embodiment of the projection spectra and filter spectra of the system from FIG. 1.

FIG. 2 shows an exemplary embodiment of the spectral relationships of a stereo projection system as in FIG. 1. The diagram takes the form of an extinction spectrum, with the extinction being represented in the logarithmic scale of optical densities (OD). As in FIG. 1 as well, the components associated with the viewer's left eye are shown in dashed lines, while the components associated with the viewer's right eye are shown in solid lines. In the embodiment shown, the right image 16 can be constructed from four laser lines at approximately 425, 510, 590, and 650 nanometers wavelength. When the intensities of the individual lines are appropriately matched, projected points can be generated that can be perceived by a viewer as any color of the visible spectrum. The right image 16 on the screen 18 can be constructed of such colored points. Similar applies to the left image 14, which in the embodiment shown can be constructed from three laser lines at approximately 475, 560, and 620 nanometers wavelength. As an alternative to composition of the images 14, 16 from different laser lines, appropriate interference or absorption filters in conjunction with white light illumination can also be used. The distribution of the peaks in the projection spectrum can of course differ substantially from the embodiment shown in FIG. 2. It should be understood this is shown purely by way of example.

Figure 3:
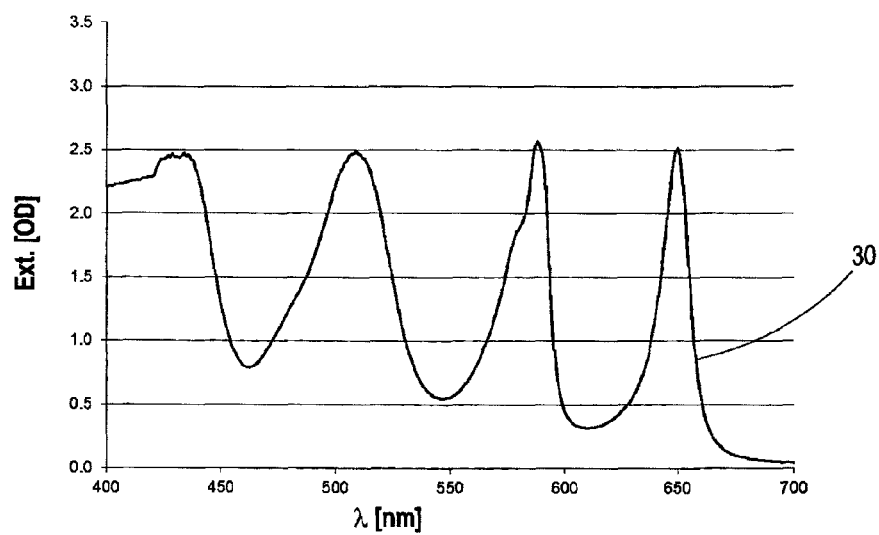
FIG. 3 illustrates an isolated filter spectrum for the left viewing window of the viewing device of the system from FIG. 1.
Figure 4:
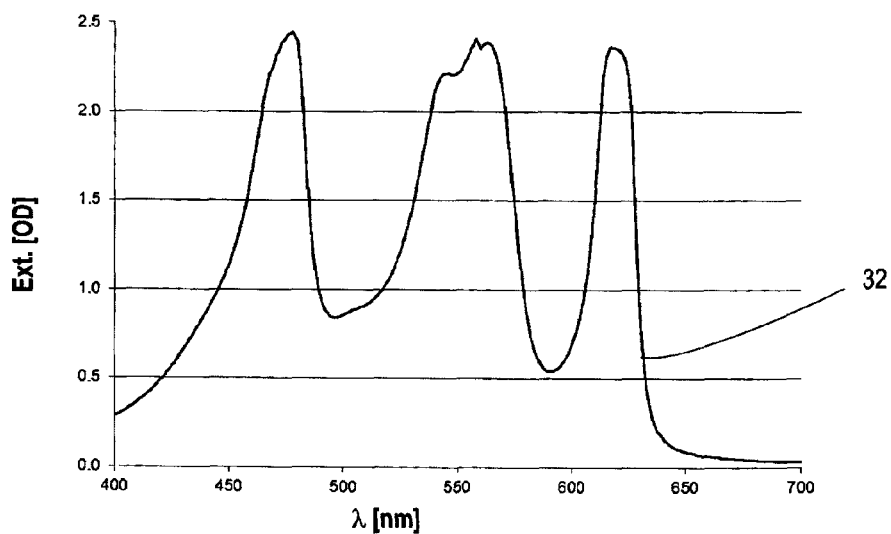
FIG. 4 illustrates an isolated filter spectrum for the right viewing window of the viewing device of the system from FIG. 1.

The filter spectra 30, 32 of the viewing windows 22, 24 are matched to the projection spectra 26, 28 of the images 14, 16. In particular, the left filter spectrum 30, which is to say the filter spectrum of the left viewing window 22, has its pass bands where the left projection spectrum 26 has its peaks, which is to say where the projection laser lines of the left projection spectrum 26 are located in the embodiment shown. The left filter spectrum 30 has its blocking regions, or in other words its regions of maximum extinction, precisely where the right projection spectrum 28 has its peaks, i.e., its laser lines in the embodiment shown. By this means, the result is achieved that only the left image 14 can pass through the left viewing window 22, and can thus be perceived by the viewer's left eye alone. Similar considerations apply to the right filter spectrum 32, which is to say the filter spectrum of the right viewing window 24. Its pass bands are located where the right projection spectrum 28 has its peaks, or has its laser lines in the embodiment shown. The right filter spectrum 32 has its blocking regions where the left projection spectrum 26 has its peaks, or has its laser lines in the embodiment shown. It is ensured by this means that the right image 16 can only pass through the right viewing window 24, and can only be perceived by the viewer's right eye. The filter spectra 30, 32 of the left and right viewing windows 22, 24 are shown once again, separately, in FIGS. 3 and 4.

In technical terms, these filter spectra can be generated through layered application of the following dyes (intern. designation), of which the first three, in particular, are in the supramolecular J-aggregate configuration:

3-Ethyl-2-[3-(3-ethyl-3H-benzothiazol-2-ylidene)-propenyl]-benzothiazolium iodide, 2-[5-[1,1-Dimethyl-3-(4-sulfobutyl)-1,3-dihydro-benzo [e] indol-2-ylidene]-penta-1,3-dienyl]-1,1-dimethyl-3-(4-sulfobutyl)-1H-benzo [e] indolium hydroxide, 5,6-Dichloro-2-[[5,6-dichloro-1-ethyl-3-(4-sulfobutyl)-benzimidazol-2-ylidene]-propenyl]-1-ethyl-3-(4-sulfobutyl)-benzimidazolium hydroxide mixed with 3-ethyl-2-[3-(3-ethyl-3H-benzothiazol-2-ylidene)-propenyl]-benzothiazolium iodide, 5,5-Dichloro-3,3'-disulfobutyl-benzothiazoltrimethincyanin-triethylammonium, 5,5-Dichloro-3,3'-disulfobutyl-3-ethyl-benzothiazoltrimethincyanin-triethylammonium, 3,3'-Disulfobutyl-3-ethyl-naphtthiazoltrimethincyanin-triethylammonium.

In order to produce the layers, the dissolved dyes, whose spectral characteristics can be precisely adjusted through the choice of the solvent and/or the addition of salts and/or surfactants, are applied as a single layer at a time to a carrier, in particular a flexible film that is transparent in the visible range. In this process, the absorption strength is adjusted to the desired measure by the layer thickness and the dye concentration. When the dye layer is applied, particular attention must be paid to high homogeneity, which is to say to variations in optical extinction of less than 1%. Then a subsequent layer can be applied that is based on another dye. It is important to avoid intermixing of the layers here. This can be accomplished by the means that the subsequent layer is not applied until after the preceding layer has dried, for example. It is also possible to apply layers that are still damp on top of one another, however. In order to prevent intermixing, the individual layers can be electrically charged, for example, or suitable separator layers, e.g. made of a transparent film, can be applied between the dye layers. In this way, a filter system with the desired characteristics is formed in layers.

The viewing windows produced in such a manner are, for example, glued to a simple plastic or cardboard eyeglass frame as the "lenses" of viewing eyeglasses, and the entire viewing device is then packaged in a lightproof way. The lightproof packaging is important because the J-aggregate configuration of the cyanine dyes used is highly light-sensitive. Intense light incidence results in destruction of the J-aggregate configuration, and thus flattening, broadening, and displacement of the extinction peaks in the filter spectrum. Consequently, the matching of the filter characteristics of the viewing windows to one another and to the projection spectra that originally had been optimal declines; the three-dimensional impression for the viewer diminishes. With the low light exposure during a typical movie show, the J-aggregates are stable enough to ensure a good 3D effect for the viewer for the duration of the entire show. Afterwards, but at the latest when the pair of glasses is exposed to daylight, it will scarcely be usable any longer, and will have to be replaced by a new pair of glasses for another show, which is a welcome source of income for the theater operator.

Of course, the embodiments discussed in the specific description and shown in the figures are only illustrative exemplary embodiments of the present invention. In light of the instant disclosure, a wide range of possible variations are made available to the person skilled in the art. In particular, the number and position of the extinction peaks in the projection spectrum can differ substantially from the examples shown here. Depending on the concrete application, the person skilled in the art will undertake such a matching so that a clean separation of the right and left spectra is provided and a uniform color impression with uniform brightness is produced for both of the viewer's eyes. The almost unfathomable variety of dyes, especially cyanine dyes, allows the person skilled in the art to find suitable dyes in a J-aggregate configuration for any specific constellation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A viewing device for a stereo projection system comprising:
a first viewing window; and
a second viewing window, the first and second viewing window each having an optically filtering filter layer system,
wherein the first and second viewing window each have a filter spectrum in the visual spectral range with a plurality of pass bands that are separated from each other by blocking regions,
wherein each pass band of the filter spectrum of the first viewing window is covered by an associated blocking region of the filter spectrum of the second viewing window,
wherein each filter layer system is designed as an absorption filter layer system having a plurality of substances absorbing in differing spectral ranges,
wherein a first one of the absorbing substances is a cyanine dye in the supramolecular configuration of a J-aggregate, and
wherein a second one of the absorbing substances is a rhodamine or squaraine dye.

2. The viewing device according to claim 1, wherein each filter layer system has a plurality of individual filter layers, wherein each individual filter layer contains one or more absorbing substances that jointly produce exactly one of the blocking regions of the filter spectrum.

3. The viewing device according to claim 1, wherein each filter layer system is knife-coated onto a carrier that is transparent in the visible spectral range.

4. The viewing device according to claim 1, wherein each filter layer system is applied using the cascade coating method to a carrier that is transparent in the visible spectral range.

5. The viewing device according to claim 3, wherein the carrier is a flexible film that is transparent in the visible spectral range.

6. The viewing device according to claim 1, wherein the transmittance of each viewing window in each blocking region of its filter spectrum is less than one percent of the transmittance of the associated pass band of the filter spectrum of the respective other viewing window.

7. The viewing device according to claim 1, wherein the transmittance of each viewing window in each blocking region of its filter spectrum is less than one percent of the transmittance of each immediately adjacent pass band of the filter spectrum of the same viewing window.

8. A stereo projection system comprising:
a projection unit that projects a first and a second image, which represent an object from different viewing angles, onto one another on a projection screen in a visual spectral range with orthogonal projection spectra; and
a viewing device that has a first and a second viewing window, the first and the second viewing windows each having an optically filtering filter layer system whose orthogonal filter spectra in the visual spectral range are matched to the projection spectra of the projection unit such that the first viewing window is transparent for the first projection spectrum and the second viewing window is transparent for the second projection spectrum,
wherein each of the first and second viewing windows has a filter spectrum in the visual spectral range with a plurality of pass bands that are separated from each other by blocking regions,
wherein each pass band of the filter spectrum of the first viewing window is covered by an associated blocking region of the filter spectrum of the second viewing window,
wherein each filter layer system is configured as an absorption filter layer system having a plurality of substances absorbing in differing spectral ranges, and
wherein at least one of the absorbing substances is a cyanine dye in the supramolecular configuration of a J-aggregate.

* * * * *